United States Patent
Mancevski et al.

(10) Patent No.: US 10,446,332 B2
(45) Date of Patent: Oct. 15, 2019

(54) ULTRATHIN ASYMMETRIC NANOPOROUS-NICKEL GRAPHENE-COPPER BASED SUPERCAPACITOR

(71) Applicants: Alexander Graziani Mancevski, Austin, TX (US); Vladimir Mancevski, Austin, TX (US)

(72) Inventors: Alexander Graziani Mancevski, Austin, TX (US); Vladimir Mancevski, Austin, TX (US)

( * ) Notice: Subject to any disclaimer, the term of this patent is extended or adjusted under 35 U.S.C. 154(b) by 0 days.

(21) Appl. No.: 15/880,453

(22) Filed: Jan. 25, 2018

(65) Prior Publication Data

US 2018/0218846 A1 Aug. 2, 2018

Related U.S. Application Data

(60) Provisional application No. 62/450,511, filed on Jan. 25, 2017.

(51) Int. Cl.

| | |
|---|---|
| *H01G 11/32* | (2013.01) |
| *H01G 11/26* | (2013.01) |
| *H01G 11/52* | (2013.01) |
| *H01G 11/86* | (2013.01) |
| *H01G 11/70* | (2013.01) |
| *H01G 11/68* | (2013.01) |
| *H01G 11/46* | (2013.01) |
| *H01G 11/02* | (2013.01) |
| *H01G 11/04* | (2013.01) |
| *H01G 11/28* | (2013.01) |

(Continued)

(52) U.S. Cl.
CPC ............ *H01G 11/32* (2013.01); *H01G 11/02* (2013.01); *H01G 11/04* (2013.01); *H01G 11/26* (2013.01); *H01G 11/28* (2013.01); *H01G 11/36* (2013.01); *H01G 11/46* (2013.01); *H01G 11/52* (2013.01); *H01G 11/68* (2013.01); *H01G 11/70* (2013.01); *H01G 11/86* (2013.01); *H01G 11/54* (2013.01); *Y02E 60/13* (2013.01)

(58) Field of Classification Search
CPC ........ H01G 11/24; H01G 11/26; H01G 11/30; H01G 11/46; H01G 11/52; H01G 11/68; H01G 11/70; H01G 11/86
See application file for complete search history.

(56) References Cited

U.S. PATENT DOCUMENTS

| | | | | |
|---|---|---|---|---|
| 2002/0182503 A1* | 12/2002 | Asari | ................ | C09C 1/56 429/231.1 |
| 2010/0209779 A1* | 8/2010 | Wendman | ............ | H01G 9/025 429/310 |

(Continued)

*Primary Examiner* — Nguyen T Ha (57) ABSTRACT

Energy storage asymmetric supercapacitor devices utilizing nanoporous-nickel and graphene-copper materials, and methods for fabrication of these supercapacitor devices are described herein, in accordance with embodiments of the invention. The invention describes a single asymmetric redox-supercapacitor unit and assembly of two or more supercapacitor units connected in series to increase the voltage range of the assembly. A double-sided supercapacitor electrode embodiment of this invention, having anode materials on one side, cathode materials on the opposing side of the electrode, and a common current collector in between, is also described in this invention.

3 Claims, 4 Drawing Sheets

(51) Int. Cl.
  *H01G 11/36*  (2013.01)
  *H01G 11/54*  (2013.01)

(56) References Cited

U.S. PATENT DOCUMENTS

| | | | | |
|---|---|---|---|---|
| 2010/0330425 | A1* | 12/2010 | Lopatin | C25D 3/38 |
| | | | | 429/220 |
| 2012/0070725 | A1* | 3/2012 | Venkatachalam | H01M 4/1397 |
| | | | | 429/188 |
| 2013/0115453 | A1* | 5/2013 | Fan | H05K 1/0213 |
| | | | | 428/372 |
| 2014/0212760 | A1* | 7/2014 | Zhao | H01M 4/583 |
| | | | | 429/231.8 |
| 2015/0016022 | A1* | 1/2015 | Lee | B32B 37/02 |
| | | | | 361/502 |
| 2015/0299852 | A1* | 10/2015 | Ozkan | H01L 31/068 |
| | | | | 136/255 |
| 2016/0379764 | A1* | 12/2016 | Tour | H01G 11/30 |
| | | | | 429/223 |

* cited by examiner

Prior Art

Fig. 1

Prior Art

Fig. 2A

Prior Art

ULTRATHIN ASYMMETRIC NANOPOROUS-NICKEL GRAPHENE-COPPER BASED SUPERCAPACITOR

CROSS-REFERENCE TO RELATED APPLICATIONS

This application claims the benefit of U.S. Provisional Application No. 62/450,511, filed Jan. 25, 2017.

TECHNICAL FIELD

The present invention relates to ultra-thin asymmetric nanoporous-nickel graphene-copper based supercapacitors having high energy density, battery-like voltage discharge profile, and high current density capability.

BACKGROUND OF THE INVENTION

Supercapacitors are important because of their increasing role in powering many mobile, wearable and medical devices that help and improve peoples' lives. The main advantages of supercapacitors vs. batteries are fast charging and discharging, high power, and long cyclability. Supercapacitors can store energy with electrostatic reactions, such as in electric double-layer capacitors (EDLCs), which are made from carbon materials, or they can store energy based on faradaic reactions such as in redox (or pseudo) supercapacitors, made from transition metal oxides. The main figure of merit for supercapacitors is their capacitance in Farads (F) and their energy capacity in Joules (J).

Figure 1:
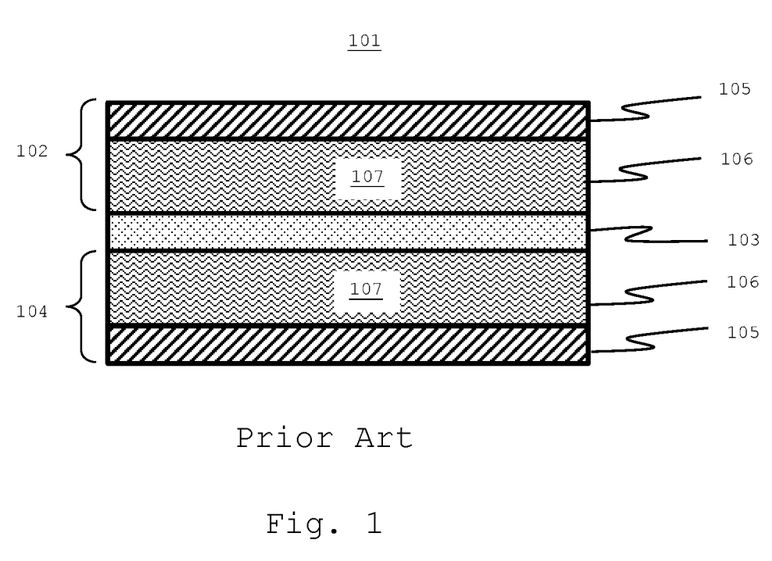
FIG. 1 shows prior art of a conventional activated carbon-based supercapacitor

Conventional supercapacitors 101 are made from three separate parts: anode electrode 102, separator wetted with liquid electrolyte 103, and cathode electrode 104, as illustrated in FIG. 1. The conventional electrode is fabricated from several components: metal foil 105 (such as copper, nickel, stainless steel, or aluminum) for current transfer, active material 106 (such as activated carbon (AC)) that stores the energy, and a polymer-based binder 107 (such as poly(vinylidenedifluoride)—PVDF, poly(tetrafluoroethylene)—PTFE, or Nafion) mixed with the active material 106 to adhere it to the metal foil 105. Disadvantages of using binder 107 are that it reduces the electrical conductivity of the supercapacitor, limits the thickness of the active layer and adds to the manufacturing cost. Activated carbon electrodes are typically thick, in the range of 100 µm and more. For example, one of the best super thin AC based supercapacitors, such as Seiko Model CPX3225A752D with 7.5 mF capacitance, has AC electrode thickness of about 200 µm, excluding the current collector. For this model, the entire stack of current collectors, activated carbon and, separator, but excluding the thickness of the environmental wrapping, is about 500 µm, which is too thick for many applications such as supercapacitors for smart cards and supercapacitors that can be incorporated with integrated circuits.

Redox (or pseudo) supercapacitors are made from transition metal, such as Ni, Mn, Co, and Ru oxides or hydroxides and are considered one of the best redox supercapacitor materials due to their high theoretical values for the specific capacitance. These redox supercapacitors are fabricated using transition metal oxide or hydroxide active material in form of powder, flakes, or nanoparticles and a polymer-based binder mixed with the active material to adhere them to a metal foil. The drawback of the binder is that it reduces the electrical conductivity of the supercapacitor and limits the thickness of the active layer. These supercapacitors have larger energy density than the activated carbon-based supercapacitors but have the same thickness disadvantages as the AC supercapacitors described above.

Among the transition metal oxides and hydroxides, NiO and $Ni(OH)_2$ have been studied due to their natural abundance and low cost. A special version of redox supercapacitors in the form of nanoporous nickel has recently been disclosed by Rice University, which is described in patent application (WO 2013/119295 A1), which is incorporated here by reference, as well as a PCT filing PCT/US2015/024945 which is also incorporated here by reference. The above prior art disclosure describes a binder-free redox supercapacitor with a nanoporous nickel layer as the active material that is an integral part of the nickel metal foil. The nanoporous nickel has pore diameters on the order of 2 to 10 nm and is different from commercially available nickel foam which has pores with diameters on the order of 200 to 500 µm. The nanoporous nickel is electrochemically-etched from the nickel foil electrode and therefore does not require use of binders. As result, the nanoporous nickel based supercapacitors can be made very thin and still preserve the energy density advantages of the transition metal-based supercapacitors with binders.

Figure 2A:
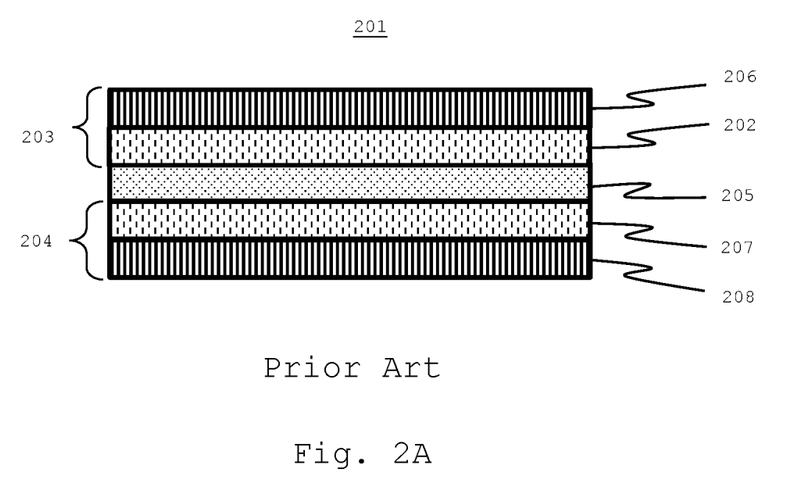
FIG. 2A shows prior art of a symmetric porous nickel-based supercapacitor

For example, a symmetric redox supercapacitor 201 with a nanoporous nickel (NiO, $NiF_2$ or $Ni(OH)_2$) as the active material 202 and 207, as illustrated in FIG. 2A, can have electrodes 203 and 204 with thickness of 10 to 25 µm that also includes the current collectors 206 and 208. The current collectors 206 (and 208) are the remainder of the nickel foil that has not been etched (the unetched nickel section of a nickel foil). Therefore, the sum of the thicknesses of the stack comprising of first current collector 206, second current collector 208, first active material 202 (nanoporous nickel), second active material 207, and separator 205, but excluding the thickness of the environmental wrapping, can be in the range of 70 to 100 µm. The voltage range of this symmetric supercapacitor is up to 1.6 V and the volumetric capacitance (F/cc) and capacity (J/cc) is a few times higher than that of an activated carbon-based supercapacitor. The thickness, the voltage, and the energy of this supercapacitor are suitable for many applications such as supercapacitors for smart cards.

Figure 2B:
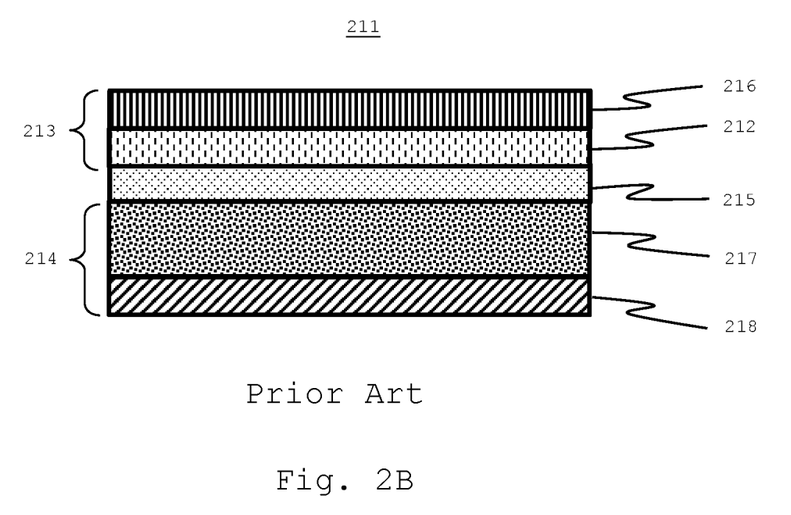
FIG. 2B shows prior art of an asymmetric porous nickel-based supercapacitor

In another example of the prior art, an asymmetric redox supercapacitor 211 with a nanoporous nickel (NiO, $NiF_2$ or $Ni(OH)_2$) as the anode 212 active material and activated carbon as the cathode 217 active material, as illustrated in FIG. 2B, can have anode electrode 213 thickness of 10 to 25 µm that also includes the anode current collector 216 (the unetched nickel section of a nickel foil), and an activated carbon cathode electrode 214 thickness of about 100 to 200 µm, including the optional current collector 218. Therefore, the entire stack of first current collector 216, second current collector 218, active material (nanoporous nickel anode 212 and activated carbon cathode 217), and separator 215, but excluding the thickness of the environmental wrapping, can be in the range of 125 to 250 µm. Although thicker than the symmetric version of the nanoporous nickel supercapacitor, the asymmetric version has wider voltage potential, up to 2 V, and therefore better volumetric capacity (J/cc) than the symmetric version.

Therefore, there is a need for an asymmetric redox supercapacitor with nanoporous nickel as the anode active material and an alternative ultra-thin carbon-based cathode to reach the performance of the device described in FIG. 2B but with an electrode thickness of the device described in FIG. 2A.

SUMMARY OF THE INVENTION

Embodiments of the invention include an energy storage device comprising, a first electrode, comprising copper foil coated with graphene; a second electrode, comprising an etched nanoporous nickel section and an unetched metallic nickel section of a nickel foil, wherein the second electrode is not in physical contact with the first electrode; and an electrolyte which is in physical contact with the first electrode and the second electrode. The electrolyte may permeate a dielectric separator located between the first and the second electrode. The first electrode may comprise one of copper oxide and copper hydroxide, on the surface of the copper foil. The graphene from the first electrode may be formed on a copper foil with chemical vapor deposition reaction.

Embodiments of the invention may instead include at least one double-sided electrode, comprising, a current collector foil comprising a copper film section and a nickel film section of the current collector foil, wherein the copper film section and the nickel film section are stacked; a top electrode, comprising a graphene coating the copper film section of the current collector; and a bottom electrode, comprising an etched nanoporous nickel film coating the nickel film section of the current collector foil; and at least one top electrolyte which is in physical contact with a top electrode and at least one bottom electrolyte which is in physical contact with a bottom electrode, wherein the at least one top and bottom electrolytes are not in physical contact with each other. The at least one top electrode may comprise one of copper oxide and copper hydroxide, on the surface of the copper foil.

Embodiments of the invention may instead include a first electrode, comprising copper foil coated with graphene; a second electrode, comprising one of transition metal oxides and transition metal hydroxides section, and metal section; and an electrolyte which is in physical contact with the first electrode and the second electrode.

DETAILED DESCRIPTION

This application claims the benefit of U.S. Provisional Application No. 62/450,511, filed Jan. 25, 2017, which is incorporated by reference herein in its entirety.

Energy storage asymmetric supercapacitor devices utilizing nanoporous-nickel and graphene-copper materials, and methods for fabrication of these supercapacitor devices are described herein, in accordance with embodiments of the invention. The invention describes a single asymmetric redox-supercapacitor unit and assembly of two or more supercapacitor units connected in series to increase the voltage range of the assembly. A double-sided supercapacitor electrode embodiment of this invention, having anode materials on one side, cathode materials on the opposing side of the electrode, and a common current collector in between, is also described in this invention.

Figure 3:
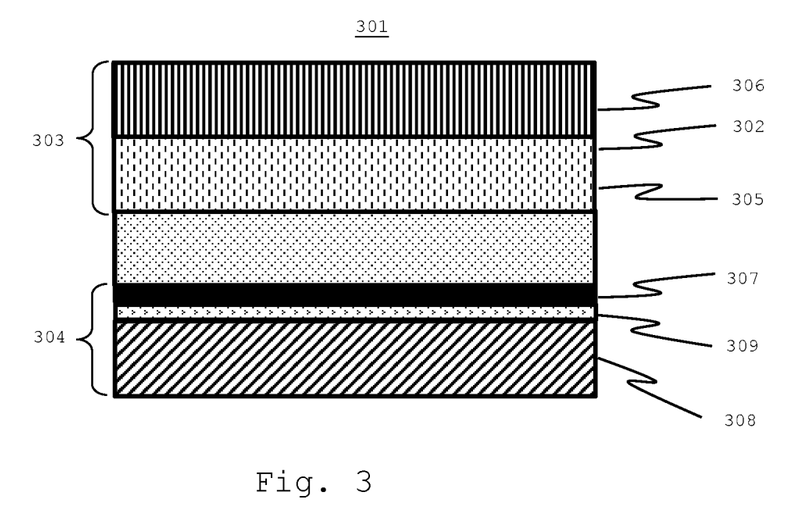
FIG. 3 shows an asymmetric nanoporous-nickel graphene-copper based supercapacitor as disclosed in the current invention

One embodiment of the current invention describes an asymmetric redox supercapacitor 301 comprising a nanoporous nickel (NiO, $NiF_2$ or $Ni(OH)_2$) layer section 302 and unetched nickel section 306 of the nickel foil as first electrode 303 and graphene 307 grown via chemical vapor deposition (CVD) process on a copper foil 308 as the second electrode 304, as illustrated in FIG. 3. In one variation of the embodiment, the copper foil 308 includes copper oxides, hydroxides, or combination of copper oxides and hydroxides 309 active material on the top surface of the copper foil facing the graphene 307, as illustrated in FIG. 3. The copper oxides and hydroxides 309 can be substantially covered by the graphene 307 or partially covered by the graphene 307.

In one variation of the embodiment, the nanoporous nickel layer 302 is part of the anode of the supercapacitor and the assembly 304 comprising of graphene film 307 on copper foil 308 is part of the cathode of the supercapacitor. In another variation of the embodiment, the graphene 307 can be grown on nickel foil (not shown in FIG. 3) and therefore the assembly 304 comprising of graphene film 307 on nickel is part of the cathode of the supercapacitor. In another variation of the embodiment, the nickel foil includes nickel oxides, hydroxides, or a combination of nickel oxides and hydroxides 309 active material on the top surface of the nickel foil facing the graphene 307.

In another variation of the embodiment, the graphene 307 can be removed from the copper 308 or nickel substrate and placed on an alternative substrate (not shown in FIG. 3) or used without an additional substrate.

Graphene is well known to those skilled in the art as an excellent conductor and energy storage material. As carbon based active material the graphene stores energy electrostatically, such as in electric double-layer capacitors (EDLCs). Therefore, the graphene 307 in the current invention stores charge as in an EDLC supercapacitor. The graphene 307 in the current invention can be made in 1, 2, 3 or few monolayers and is therefore atomically thin, giving rise to high volumetric energy capacity.

The presence of the copper foil substrate 308 in the current invention adds additional energy storage based on faradaic redox reactions typical to transition metal oxides and hydroxides. Therefore, the presence of copper oxides and hydroxides active material 309 on the surface of the copper foil 308 contributes to a redox based energy storage capacity. Examples of copper active material include copper (II) hydroxide, $Cu(OH)_2$, cuprous oxide ($Cu_2O$) and cupric oxide (CuO). In one embodiment of the current invention, the copper oxides and hydroxides 309 on the surface of the copper foil 308 are formed during the oxidation and reduction electrochemical processes at the copper surface in presence of aqueous supercapacitor electrolytes, such as 6 M KOH electrolyte, during charging and discharging of the supercapacitor cell. In another embodiment of the current invention, the copper oxides and hydroxides 309 are formed by preparing the copper foil 308 coated with graphene film 307 to form oxides and hydroxides 309 before the supercapacitor cell is assembled and operated.

Therefore, the combination of graphene and copper active material in one of the electrodes provides energy storage via electrostatic reactions as well as faradaic reactions.

In one embodiment of the current invention the graphene is synthesized on copper foil with an atmospheric pressure chemical vapor deposition (CVD) reaction. Alternatively, the substrate can be nickel foil. In this process for growth of graphene, a quartz tube containing a copper foil is heated to 1000 C or less under the flow of Argon and Hydrogen in ratios of 1:1 until a stable temperature of 1000 C is reached. The flow of Argon and Hydrogen at 1000 C is held for 30 min to 60 minutes so as to reduce the copper surface and remove copper oxide from the foil's surface. Afterwards, a precursor gas, such as Methane is flowed with rates of 100:1 with respect to Argon. Other precursor gasses, such as Ethylene or Acetylene can also be used. Typical graphene growth times are 3 to 5 minutes but graphene can also be grown from 10 to 30 minutes depending on the recipe. Afterwards, the precursor flow is stopped and the sample can be removed and cooled or the oven can be turned off and the sample and the oven can be cooled together while maintaining a flow of Argon and Hydrogen for large fraction of the cooling time. Alternatively, the graphene layer 307 can be processed to cover the copper foil 308 using plasma based chemical vapor deposition (CVD) reaction.

In one embodiment of the current invention the graphene is synthesized as described in patent application (PCT/US2016/039217), which is incorporated here by reference.

In another variation of the embodiment, other carbon-based materials that may be used instead graphene 307, to cover the copper foil 308, include but are not limited to graphite, graphene flakes, graphene oxide, reduced graphene oxide, and graphene nanoribbons.

In one embodiment of the current invention the graphene layer 307 can be prepared to cover the copper foil 308 using wet chemical methods well known to those skilled in the art of graphene deposition processes. In one example, graphene oxide (GO) is dispersed in a solution of deionized water and then dip coated or spin coated on a previously cleaned Cu foil to form a thin film. The as prepared sample is dried at 80° C. under nitrogen flux for 15 min. The final step is a thermal process leading to the reduction of GO film into reduced GO (rGO) film by heating the sample at 200° C. or higher under an inert Ar atmosphere for 1 h.

Copper foils that can be used as a substrate to grow graphene are commercially available in thicknesses in the range of 9 to 25 μm. Thicker copper foils are available but are not desirable. After the graphene growth the overall thickness of the copper foil with graphene grown on it does not change significantly because the graphene layers are atomically thin. Therefore, the thickness of a graphene-copper cathode in an asymmetric redox supercapacitor can be in the range of 9 to 25 μm, including the current collector (the copper substrate itself). In one embodiment of the current invention the graphene-copper cathode is paired with nanoporous nickel (NiO, $NiF_2$ or $Ni(OH)_2$) as the anode active material with anode thickness in the range of 10 to 25 μm that also includes the current collector. In one variation the nanoporous nickel is electrochemically-etched from the nickel foil electrode and therefore does not require use of binders. Therefore, in one embodiment the entire stack of current collectors, active material (nanoporous nickel anode and graphene-copper cathode), and separator that is 50 μm thick, but excluding the thickness of the environmental wrapping, can be in the range of 69 to 100 μm. In an alternative embodiment having a separator that is 10 μm thick, the entire stack can be in the range of 29 to 60 μm. Other combinations of different thicknesses of the anode, cathode and the separator are also possible with the current invention.

In one embodiment of the current invention the separator can be a polyamide or polypropylene polymer film that is ion conductive. Commercially available separators range from 12 to 50 μm thick and are available from vendors such as Celgard.

In one embodiment of the current invention the separator is made of ion-conductive polymer that is soaked with 6 M KOH electrolyte. Other electrolytes, such as 1 M NaOH or 2 M LiOH, or any combination of KOH, NaOH, and LiOH in any practical molarity concentration can also be used in this invention. Alternatively, the separator and the electrolyte can be replaced by a gel electrolyte that plays the role of both a separator and solid-state electrolyte. One method for synthesis and deposition of gel-based electrolyte and separator is prepared by dissolving 1 g PVA (50,000 or 100,000 MW) in 20 mL DI water while stirring and heating the solution at 95 C for 2 hours. Afterwards 1 g KOH will be added. After the PVA/KOH solution becomes clear it can be applied to the electrode and dried under an inert atmosphere to protect the KOH from reacting with the atmosphere. Gel films with thickness from 10 μm to 200 μm are possible.

The voltage range of the symmetric supercapacitor disclosed in the current invention is up to 2 V. The thickness, the voltage, and the energy of this supercapacitor are suitable for many applications such as supercapacitors for smart cards and supercapacitors that can be incorporated into integrated circuits.

Figure 4:
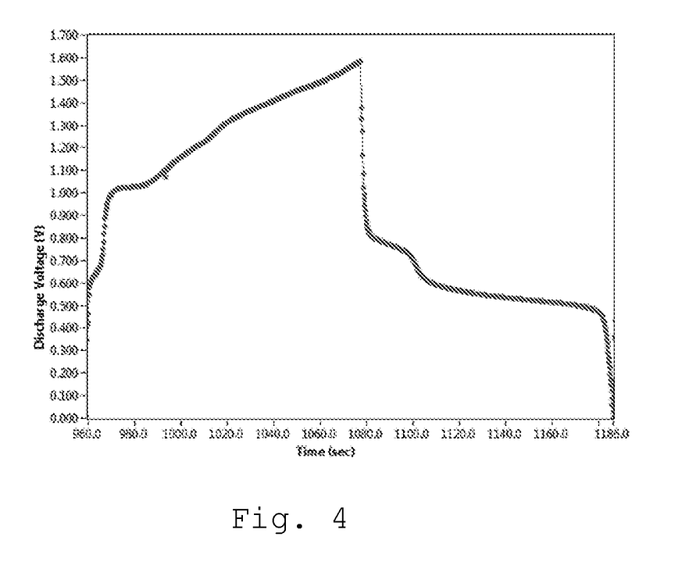
FIG. 4 shows a single cycle of a typical charge-discharge curve for the supercapacitor as disclosed in the current invention

In one embodiment of the current invention the asymmetric redox-supercapacitor has a long discharge time of 110 sec and discharges with a flat voltage plateau like a battery, as shown in FIG. 4, which makes the supercapacitor usable for applications that require sustained voltage.

In one embodiment of the current invention the anode active material can be a transition metal, such as Ni, Mn, Co, and Ru oxides or hydroxides. In another embodiment of the current invention the anode metal oxides or hydroxides active material can be in form of powder, flakes, or nanoparticles and can be mixed with polymer-based binder and have other conductive additives such as carbon black, carbon nanotubes, and graphene nanoribbons. In another embodiment of the current invention the Ni, Mn, Co, and Ru oxides or hydroxides are electrodeposited on a thin metal to become the anode active material.

In one embodiment of the current invention the copper substrate used to grow graphene does not have to be commercially available foil but can instead be electrodeposited copper on another substrate. In one embodiment copper can be electrodeposited on stainless steel foil from an aqueous solution of 0.75 M $CuSO_4$ and 1.5 M $H_2SO_4$. The copper film can be used as deposited or it can be removed from the stainless steel foil and used by itself. The electrodeposited copper can be used as a substrate for graphene growth in a CVD reaction.

In another embodiment of the current invention the nickel on the anode can be electrodeposited from an aqueous solution of 0.05 M $NiSO_4$ with 0.5 M $H_3BO_3$ to deposit nickel film on a substrate. The electrodeposited nickel can subsequently be anodized as disclosed above.

Figure 5:
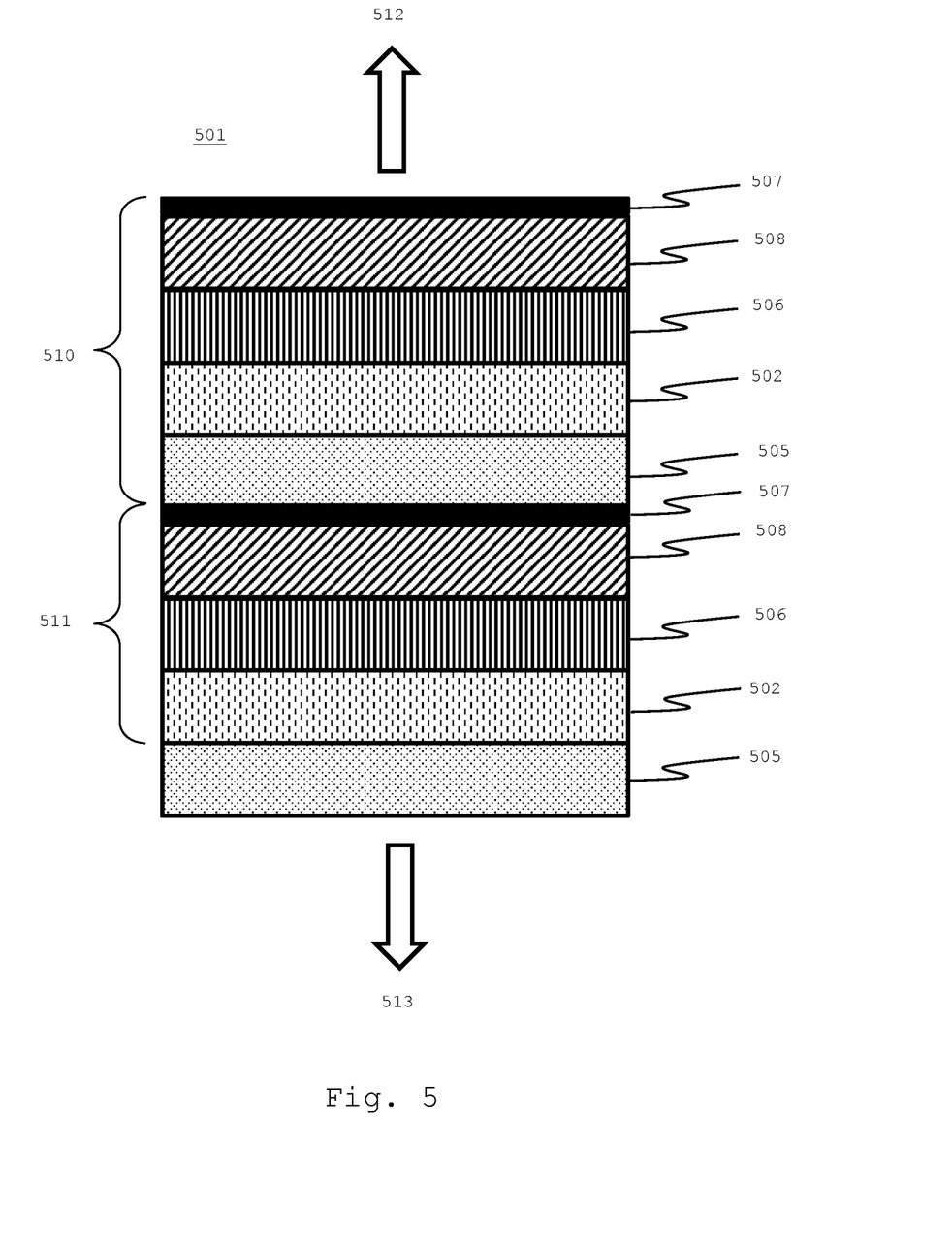
FIG. 5 shows an assembly of two or more supercapacitor units connected in series to increase the voltage range of the assembly, as disclosed in the current invention

In one embodiment of the current invention a supercapacitor assembly 501 of two or more asymmetric redox-supercapacitors from the current invention are connected in series to increase the voltage range of the assembly. Each supercapacitor adds up to 2 V to the voltage range of the assembly. FIG. 5 shows a repeating cell 510 of the supercapacitor assembly 501 comprising of copper foil 508, having first side of the copper foil coated by graphene 507 and a second side of the copper foil coated by unetched portion of a nickel metal film 506, which is covered by nanoporous nickel layer 502. The unetched portion of a nickel metal film 506 is the remainder of the nickel film after etched nanoporous nickel layer portion 502 has been formed on the side of the nickel opposite the interface with the copper foil 508. In addition, the repeating cell 510 also comprises of a dielectric or a gel-type electrolyte 505 that functions as a separator and an electrolyte at the same time.

In this embodiment of the current invention the supercapacitor electrode 511 is double sided wherein one side of the electrode is an anode of one supercapacitor and the opposing side of the electrode is a cathode of an adjacent supercapacitor, wherein the anode and the cathode share the same current collector, and wherein the adjacent supercapacitors are electrically connected in series through the current collector.

FIG. 5 shows that copper film 508 and nickel film 506 form the current collector of the double-sided electrode 511 of this invention, wherein the nanoporous nickel film 502 forms the anode of one supercapacitor and the graphene coating 507 forms the cathode of an adjacent supercapacitor, and wherein the adjacent supercapacitors are electrically connected in series through the current collector 506 and 508. In one variation of the double-sided electrode 511 embodiment, the cathode active material comprises graphene 507, and in another variation of this embodiment the cathode active material comprises graphene 507 and copper oxides, hydroxides, or combination of copper oxides and hydroxides on the side of the graphene 507 facing the copper foil 508.

A single asymmetric redox-supercapacitor unit in the supercapacitor assembly 501 of this invention comprises of: a separator 505 soaked with electrolyte; an anode portion of the supercapacitor comprising of a nanoporous nickel layer 502 active material; current collector 508 and 506 that is shared with the cathode portion of the adjacent supercapacitor cell in direction 512; a cathode portion of the supercapacitor comprising of graphene coating 507 active material, an optional film of copper oxides, hydroxides, or combination of copper oxides and hydroxides active material; and current collector 508 and 506 that is shared with the anode portion of the adjacent supercapacitor cell in direction 513.

In one example of a repeated cell construction with a double-sided electrode embodiment of this invention a copper foil 508 is 5 μm thick, where in the graphene layer 507 is atomically thin, in the range of 1 to 3 Å; an optional film of copper oxides, hydroxides, or combination of copper oxides and hydroxides is atomically thin; a nickel film 506, attached to the copper foil 508, is 5 μm thick, wherein the nanoporous nickel layer 502 is 7 μm thick; and a separator is 10 μm thick. Thus, the combined thickness of the repeated cell with a double electrode embodiment of this invention is 27 μm thick. In another example of a supercapacitor assembly 501 of this invention made of 10 repeated cells would be 270 μm thick. This thickness makes the present invention very suitable as supercapacitors for smart cards and as supercapacitors that can be incorporated with integrated circuits. It is desirable that a supercapacitor assembly 501 comprising of more than two repeated units, that the top end and bottom end elements of the assembly terminate with a current collector 508 or 506 and not an active material so as to enable better electrical coupling of the end elements to the external electrical components. One such coupling would be to solder a terminal tab on nickel current collector or a spot weld a terminal tab on a copper current collector.

In one embodiment of the current invention the double-sided electrode 511 can be fabricated by starting with a copper foil 508 on which a graphene film 506 is grown via CVD reaction, followed by electrodeposition of a nickel film 506 on the side of the copper foil opposite the interface with the graphene film 506, where the nickel film is subsequently etched to produce nanoporous nickel layer 502 on the side of the nickel layer 502 opposite the interface with the copper foil 508. Alternatively, the graphene 506 is grown on both sides of the copper foil 508 and the nickel is electrodeposited over the graphene 506 on one side of the copper foil 508. Alternatively, the nickel film 506 can be electrodeposited on the copper foil 508, and graphene is grown over the exposed sides of the copper foil 508 and the nickel film 506, followed by etching a nanoporous nickel layer 502 from the nickel layer covered with graphene film. Alternatively, one the fabrication of a double-sided electrode 511 can be conducted by starting with a nickel foil and electrodepositing a copper film.

The asymmetric redox-supercapacitor of this invention can be packaged in any form and with any materials typically used to package supercapacitors, including a stainless steel coin cell, polymer based pouch cell, and millimeters sized rectangular ceramic packages suitable for integrated circuit use and assembly.

Embodiments of the invention have applications, including but not limited to, smart cards, wearables, Internet of Things (IoT) devices, medical devices, integrated circuits, accessory for batteries, such as Li-ion batteries, and sensors.

The specific embodiments described above are merely exemplary, and it should be understood that these embodiments may be susceptible to various modifications and alternative forms. It should be further understood that the claims are not intended to be limited to the particular embodiments or forms disclosed, but rather to cover all modifications, equivalents, and alternatives falling within the spirit and scope of this disclosure.

The invention claimed is:

1. An energy storage device, comprising:
    a first electrode, comprising copper foil coated with graphene;
    a second electrode, comprising an etched nanoporous nickel section and an unetched metallic nickel section of a nickel foil, wherein the second electrode is not in physical contact with the first electrode; and
    an electrolyte which is in physical contact with the first electrode and the second electrode;
  wherein the first electrode comprises one of copper oxide and copper hydroxide, on the surface of the copper foil.

2. An energy storage device, comprising:
    at least one double-sided electrode, comprising,
    a current collector foil comprising a copper film section and a nickel film section of the current collector foil, wherein the copper film section and the nickel film section are stacked; a top electrode, comprising a graphene coating the copper film section of the current collector; and
    a bottom electrode, comprising an etched nanoporous nickel film coating the nickel film section of the current collector foil; and
  at least one top electrolyte which is in physical contact with a top electrode and at least one bottom electrolyte which is in physical contact with a bottom electrode, wherein the at least one top and bottom electrolytes are not in physical contact with each other.

3. An energy storage device of claim 2, wherein the at least one top electrode comprises one of copper oxide and copper hydroxide, on the surface of the copper foil.

* * * * *